June 14, 1960 J. BRITT 2,940,618
VESSEL CHARGING AND DISCHARGING APPARATUS
Filed May 7, 1956
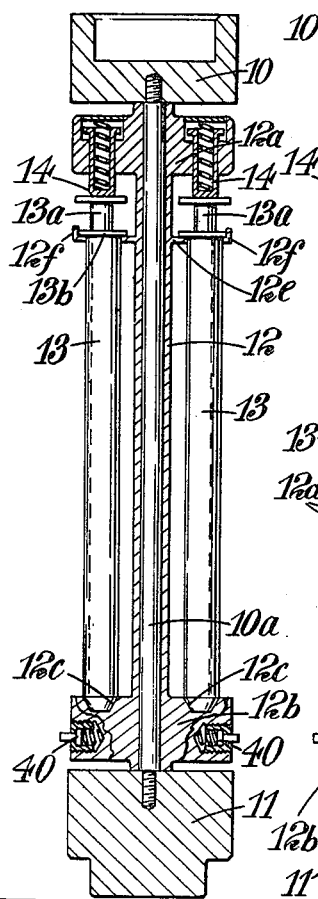
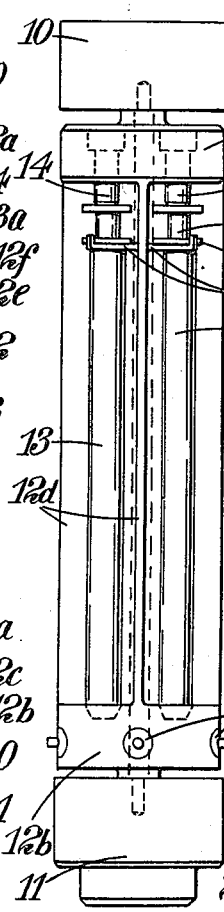
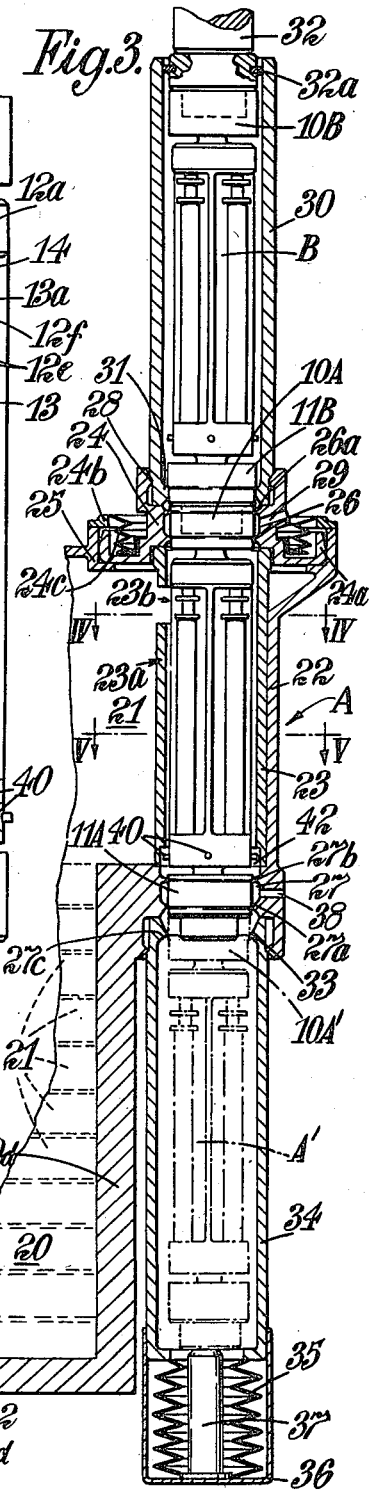
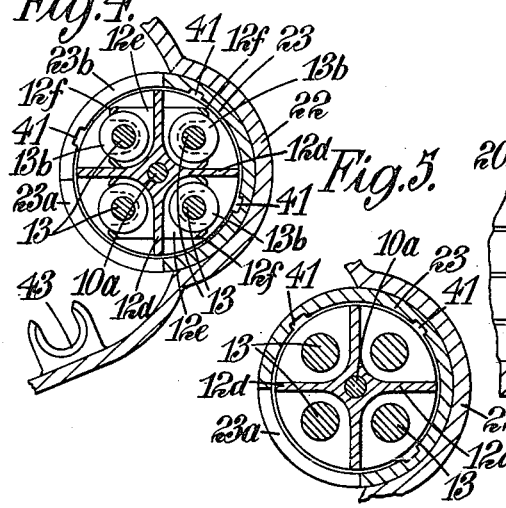

United States Patent Office 2,940,618
Patented June 14, 1960

2,940,618

VESSEL CHARGING AND DISCHARGING APPARATUS

Jack Britt, Tollerton, England, assignor to Rolls-Royce Limited, Derby, England, a British company Filed May 7, 1956, Ser. No. 583,208

Claims priority, application Great Britain May 19, 1955

11 Claims. (Cl. 214—17)

This invention relates to vessel charging and discharging apparatus and seeks to provide apparatus for introducing bodies into the confines of a closed vessel and removing such bodies therefrom, said charging and discharging operations being carried out in a manner such as to provide fluid-tightness of the vessel when the body is positioned therein, and to avoid major loss of fluid medium from the vessel during these operations.

The invention is applicable more particularly to atomic power reactors where it is desirable to introduce fuel elements into a vessel containing the reactor structure, which may for instance be cooled by a liquid such as liquid sodium.

According to the present invention, a vessel charging and discharging apparatus comprises an assembly of axially-spaced plug-like seal members of relatively soft metal with means therebetween for supporting the body to be introduced and removed from the vessel, correspondingly-spaced sealing surfaces on the vessel, which surfaces are formed of relatively hard metal, define charging and discharging apertures through which the assembly with the body supported therein is introduced into the vessel and removed therefrom, and co-operate with the plug-like seal members to effect sealing of the vessel when the assembly has been introduced into the vessel, the dimension of the co-operating sealing surfaces at the charging aperture being greater than that of the discharging aperture, and means for urging succeeding assemblies through said seals to remove a first assembly from the vessel and introduce a second assembly, the arrangement being such that said plug-like seal members are successively deformed by the co-operating sealing surfaces on the vessel.

According to an important feature of the present invention an assembly removed from the vessel may be introduced into a discharging cylinder supported adjacent the discharge aperture, said cylinder having at its end adjacent the discharge aperture an internal sealing surface, the dimension of which is less than that of the sealing surface defining the discharge aperture, whereby when an assembly is ejected from the vessel, the plug-like seal members are deformed by co-operation with the internal sealing surface and the assembly is sealed within said discharge cylinder by co-operation of one plug-like seal member with said internal sealing surface.

According to yet a further feature of the invention, an assembly may be accommodated within a charging cylinder prior to its introduction into the vessel, said charging cylinder comprising an internal sealing surface adjacent the charging aperture, which sealing surface is larger in dimension than that of the sealing surface forming the charging aperture, whereby the plug-like seals are successively deformed in passing from the internal sealing surface to that of the entry aperture.

Conveniently the plug-like seal members are of cylindrical form, and the co-operating sealing surfaces on the vessel have circular lips acting as dies for deforming the plug-like members.

One preferred embodiment of the invention is illustrated in the accompanying drawings. The embodiment illustrated is for the purpose of introducing fuel elements into a vessel containing the reactor structure of an atomic power generator.

In the drawings:

Figure 1 illustrates in section an assembly of axially-spaced plug-like seal members with means for supporting the fuel rods therebetween, Figure 2 is a side elevation of the assembly shown in Figure 1, Figure 3 illustrates the charging and discharging apparatus in association with the vessel containing the reactor structure, Figure 4 is a sectional view on the line IV—IV of Figure 3, and Figure 5 is a sectional view on the line V—V of Figure 3.

Referring to Figures 1 and 2, there is illustrated an assembly in which fuel rods are accommodated during charging. The assembly comprises upper and lower cylindrical plug-like seal members 10 and 11 respectively mounted on the ends of a central rod 10a. Extending between the upper seal member 10 and the lower seal member 11 and rotatably mounted on the rod 10a, there is a fuel rod support structure 12. The fuel rod support structure 12 has upper and lower bosses 12a, 12b respectively adjacent the seal members 10 and 11 and the bosses 12a, 12b are interconnected by webs 12d which extend radially from and are equi-angularly disposed about the central core of the support structure.

In the angles between the webs 12d and somewhat spaced from the boss 12a, horizontal webs 12e are provided and as is best seen in Figure 4, each of these webs has a laterally-facing open-ended slot and adjacent the open end of the slot upturned lugs 12f. The webs 12e provide means whereby four fuel rods 13 are supported in the structure 12. The fuel rods are provided at their upper ends with radially-flanged fittings 13a, the upper ends of which are engaged by spring-loaded plungers 14 slidably accommodated in the upper boss 12a of the structure 12, and the lower flanges 13b of which rest on the webs 12e and are retained in position by engagement behind the lugs 12f, the upper ends of the rods 13 being received in the slots in the horizontal webs 12e. A rod may be removed from the support structure 12 by lifting the flange 13b clear of the lug 12f of a web 12e and then withdrawing the rod 13 with a sideways movement. The lower ends of the rods 13 are tapered and engage in corresponding recesses 12c in the lower boss 12b.

Referring now to Figures 3 to 5, a portion of the vessel containing the reactor structure is shown. The lower portion 20 of the vessel accommodates the reactor moderator structure 21 which may be made up of beryllium or graphite bricks. The upper portion 21 of the vessel comprises an outer wall which is locally bulged at 22, as seen in Figures 4 and 5, to accommodate the charging and discharging apparatus. A tubular member 23 is let into the bulge, this tubular member being cut away in one sector indicated in Figures 4 and 5 at 23a substantially throughout its length. At its upper end it is cut away additionally in the sector indicated at 23b in Figures 3 and 4. The upper end of the part-cylinder 23 is received in a flanged fitting 24 having a part-spherical surfaced flange 24a co-operating in a cylindrical-walled opening 25 in the upper surface of the vessel. The fitting 24 is retained in fluid-tight connection on the upper surface of the vessel by means of a ring 24b welded to one end of a bellows 24c the other end of which is welded to the fitting 24. This arrangement permits thermal expansion of the assembly of seals and support structure when positioned in the vessel without disturbing sealing surfaces. The fitting 24 is of relatively hard metal such as steel and is formed with a pair of inwardly-directed sealing lips 26 and 26a which are spaced apart axially of the fitting 24. At its lower end the bulge formation 22 of the wall of the vessel merges with the outer wall 20d of the lower portion of the vessel 20, and a cylindrical discharge aperture 27 having a pair of axially-spaced inwardly-directed sealing lips 27a and 27b is formed in this end of the bulged formation.

When a fuel rod assembly A is in place the efficacy of the seals made by the seal members 10A and 11A can be tested through a connection 29 leading to the space between the sealing lips 26 and 26a, and through a connection 38 leading to the space between the sealing lips 27a and 27b.

In Figure 3 a first assembly A such as illustrated in Figures 1 and 2 is shown in position in the vessel. It will be noted that the upper seal member 10A of this assembly is in sealing engagement with the lips 26 and 26a, whilst the lower seal member 11A is in sealing engagement with the lips 27a and 27b.

Assembly charging and discharging cylinders are provided for accommodating respectively a replacement assembly indicated at B and for receiving an assembly when discharged and replaced by assembly B, the discharged assembly being indicated in chain-dotted lines at A'.

The assembly charging cylinder accommodating the replacement assembly B comprises a tubular casing 30 the external wall of which is in sealing contact at its lower end with an inwardly directed sealing lip 28 on the upper end of the fitting 24. The lower end of the cylinder is formed with an inwardly directed sealing lip 31 with which the plug 11B is in sealing engagement. The assembly B is arranged to be urged axially within the cylinder 30 by means of a hydraulic ram 32 having a sealing ring 32a, the ram bearing on the upper seal member 10B of the assembly B.

The discharging cylinder comprises a tubular casing 34 having an aperture in its lower end and a bellows 35 which is welded to the cylinder around the aperture and also to an end cap 36. The cap 36 is slidable on the outside of the cylinder 34 and supports an ejector rod 37 extending through the bellows into the aperture. The bellows 35 serves to accommodate volumetric changes which will take place when the discharged assembly is sealed within the cylinder 34 by interengagement of a sealing lip 33 provided around the mouth of the cylinder and the upper seal member 10A' of the assembly. The cylinder 34 engages a socket formed by a flange 27c of large diameter end of the outlet of the discharge aperture 27, a sealing lip being provided to co-operate with the external surface of the cylinder.

The seal members 10A, 10B, 11A, 11B are made of a relatively soft metal for instance pure iron or nickel, so that they are deformed by axial movement of the assembly relative to the sealing lips which may for example be formed from high-speed steel or tungsten carbide. Further, in the apparatus described, the sealing lip 31 is of slightly greater diameter than the sealing lip 26a, which in turn is of slightly greater diameter than the sealing lip 26. The sealing lip 26 is of slightly greater diameter than sealing lip 27b around the discharge aperture 27 and the lip 27b in turn is slightly greater in diameter than the sealing lip 27a, which in turn is of slightly greater diameter than the further sealing lip 33 at the upper end of the discharging cylinder 34.

In operation of the apparatus, the assembly A is discharged from the reactor vessel and replaced by the assembly B by a single downward movement of hydraulic ram 32. During the initial part of this movement, the seal member 10A is forced successively through sealing lips 26a, 26, the sealing member 11B is forced through the sealing lip 31 into engagement with the lips 26a, 26, and simultaneously the sealing member 11A is forced through the sealing lips 27b, 27a and is engaged in the sealing lip 33. Continued downward movement of the ram 32 causes the assembly B to take up the position of assembly A, the latter being moved to the position A' and during this movement the sealing member 10B is forced through sealing lip 31 into engagement with the sealing lips 26a, 26, sealing member 11B is forced into engagement with the sealing lips 27b, 27a, and the sealing member 10A is forced into engagement with the sealing lip 33.

In reaching the position of the assembly A, the sealing member 11B of the assembly B passes through sealing lip 31 to the sealing lips 26a and 26 and thereafter to sealing lips 27b and 27a. At the same time sealing member 10B passes through the sealing lip 31 to the sealing lips 26a, and 26. Due to the progressive reduction in the diameters of the lips, the sealing members are progressively deformed, and thus an efficient seal is maintained at each position of the assembly.

The assembly A having reached the discharged position A' can be removed from the apparatus accommodated within the cylinder 34 and can then be ejected from this cylinder by compression of the bellows 35.

Clearly the upper and lower bosses 12a, 12b must be of a smaller diameter than the lip 33 so as not to foul any of the sealing lips during the charging and discharging operation.

In the apparatus described it is intended that the fuel rods 13 are moved from the assembly when in position A to locations within the reactor structure. To this end any suitable form of remotely-controlled handling equipment may be used. Thus the handling equipment may comprise a swinging arm formed in articulated sections, which arm has a fuel rod gripping mechanism at its end and which is also movable in the direction of its swinging axis, i.e. up and down as viewed in Figure 3, whereby the gripping mechanism can be positioned to occupy any point within a cylinder.

In order that one fuel rod 13 should be correctly located when an assembly is in place, spring-loaded plungers 40 are provided in the lower boss 12b of the support structure 12, as more clearly seen in Figures 1 and 2. These plungers engage spiral slots 41 formed in the wall of the part-cylinder 23 and ensure that during the downward movement of the assembly into the position shown at A the support 12 is rotated to a correct angular position presenting one fuel rod for handling by the arm. At their lower ends the spiral slots 41 run out into an annular recess 42 whereby the support thereafter is free for rotation. The rotation is effected by means of the handling arm which has free access to the webs 12d at the upper end of the part-cylinder 23 by virtue of the semi-circular cut-away at 23a and 23b.

In utilising the four fuel rods 13 on the support of the assembly, therefore, a rod is removed from the reactor structure by means of the handling arm and is supported temporarily on a forked parking lug 43 on the wall 22 of the upper portion 21 of the vessel. Thereafter one of the fuel rods of the assembly A is moved by the handling mechanism and positioned in the reactor structure. The parked fuel rod is then removed from the lug 43 and positioned in the assembly A and the handling arm is then used to rotate the support 12 of the assembly to present a further rod for removal to the reactor structure.

I claim:

1. Vessel charging and discharging apparatus comprising an assembly of axially-spaced plug-like seal members of a first metal with means therebetween for supporting the body to be introduced and removed from the vessel, correspondingly-spaced sealing surfaces on the vessel, which surfaces are formed of a second metal which is harder than said first metal and is capable of deforming said first metal without substantial wear to itself, define charging and discharging apertures through which the assembly with the body supported therein is introduced into the vessel and removed therefrom, and co-operate with the plug-like seal members to effect sealing of the vessel when the assembly has been introduced into the vessel, the dimension of the co-operating sealing surfaces at the charging aperture being greater than that at the discharging aperture, and means for urging succeeding assemblies through said seals to remove a first assembly from the vessel and introduce a second assembly, the arrangement being such that said plug-like seal members are successively deformed by the co-operating sealing surfaces on the vessel.

2. Apparatus as claimed in claim 1, wherein an assembly removed from the vessel is introduced into a discharging cylinder supported adjacent the discharge aperture said cylinder having at its end adjacent the discharge aperture an internal sealing surface, the dimension of which is less than that of the sealing surface defining the discharge aperture, whereby when an assembly is ejected from the vessel, the plug-like seal members are deformed in co-operation with the internal sealing surface and the assembly is sealed within said discharge cylinder by co-operation of one plug-like seal member with said internal sealing surface.

3. Apparatus as claimed in claim 2, wherein the discharging cylinder has an aperture in its end remote from its internal sealing surface and a cap having a cylindrical wall fitting on said end in sliding contact with the cylinder, the cylinder end and cap being joined by a bellows device permitting displacement of the cap lengthwise of the discharging cylinder and the cap carrying internally a plunger projecting towards said aperture.

4. Apparatus as claimed in claim 1, wherein an assembly is accommodated within a charging cylinder prior to its introduction into the vessel, said charging cylinder comprising an internal sealing surface adjacent the charging aperture, which sealing surface is larger in dimension than that of the sealing surface forming the charging aperture, whereby the plug-like seals are successively deformed in passing from the internal sealing surface to that of the entry aperture.

5. Apparatus as claimed in claim 1 wherein the plug-like seal members are of cylindrical from, and the co-operating sealing surfaces on the vessel have circular lips acting as dies for deforming the plug-like members.

6. Apparatus as claimed in claim 1, wherein the spaced plug-like members are mounted at each end of a rod, and the means therebetween comprises a structure rotatably mounted on the rod and adapted to support within it a plurality of rod-like bodies to be fed into the vessel.

7. Apparatus as claimed in claim 6, wherein the structure comprises bosses at its end adjacent the plug-like members, and a plurality of webs joining the bosses and extending radially of the axis of rotation of the structure, the webs defining between them spaces wherein the rod-like bodies are supported.

8. Apparatus as claimed in claim 7, wherein the radial webs are joined adjacent one boss by webs provided with laterally-facing open-ended slots and with upturned lugs at the open ends of the slots, and there are provided spring-loaded plungers in said one boss aligned with the slots and recesses in the other boss aligned with the slots, whereby each rod-like body is supported with one end in one of the recesses, its other end in the aligned slot and a flange held by the aligned plunger in engagement behind the lugs.

9. Apparatus as claimed in claim 6, wherein a tubular member is provided in the vessel between the charging and discharging apertures, said member being cut away to expose the space between a pair of the radial webs to permit removal of a rod-like body supported therein, and wherein positioning means is provided to ensure that the rotatable structure is positioned with a space in register with the cut away.

10. Apparatus as claimed in claim 9, wherein said positioning means comprises plunger elements projecting laterally from the lower boss of the rotatable structure and spiral slots in said tubular member engaged by said plungers.

11. Apparatus as claimed in claim 10, wherein said spiral slots terminate at their lower ends in an annular recess to receive said plungers when the assembly is correctly positioned axially of itself between the charging and discharging apertures whereby the rotatable structure can be rotated to bring the spaces between the radial webs successively into position in register with the cut away.

No references cited.